(No Model.)
G. RICE.
CONDUIT FOR CABLE RAILWAYS.
No. 304,860. Patented Sept. 9, 1884.
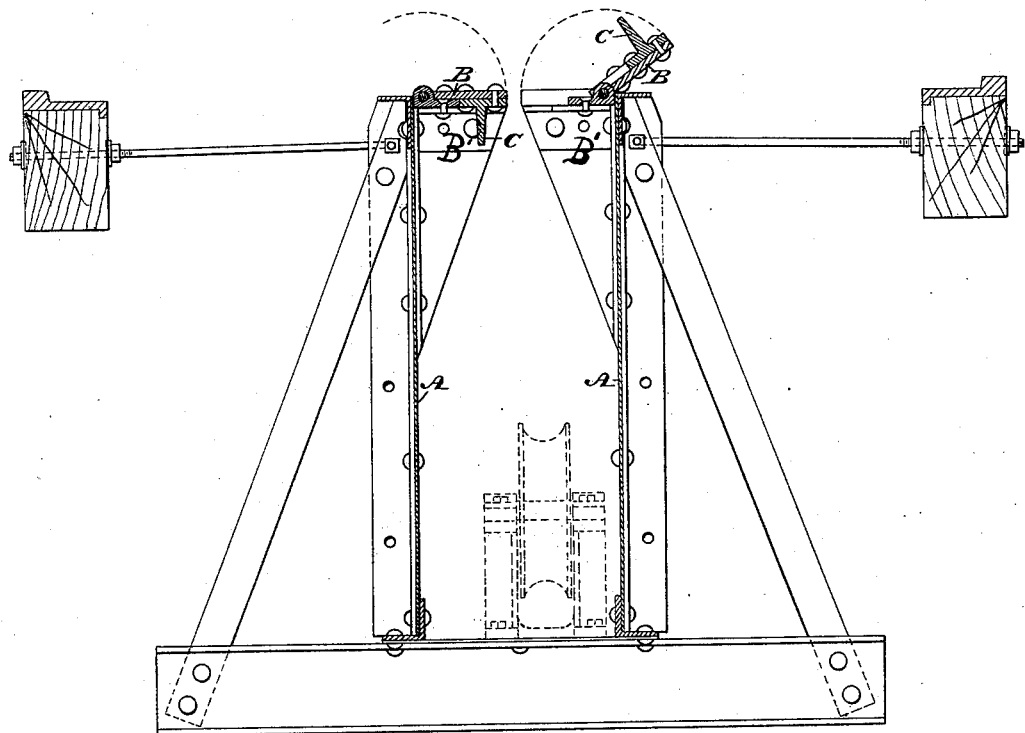
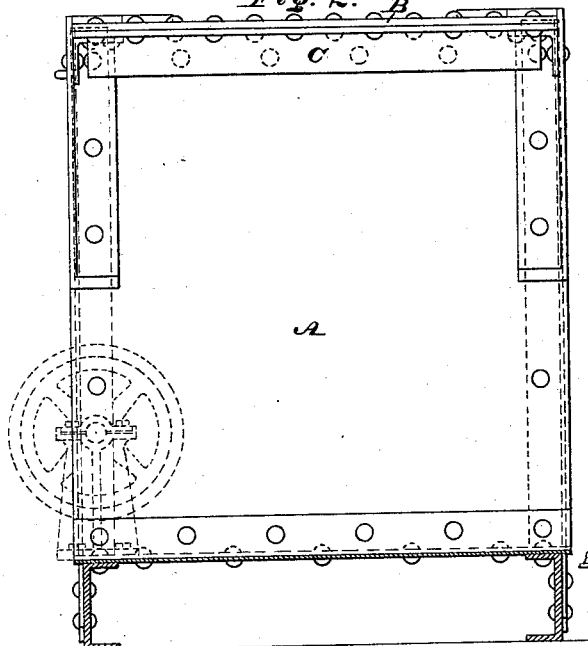
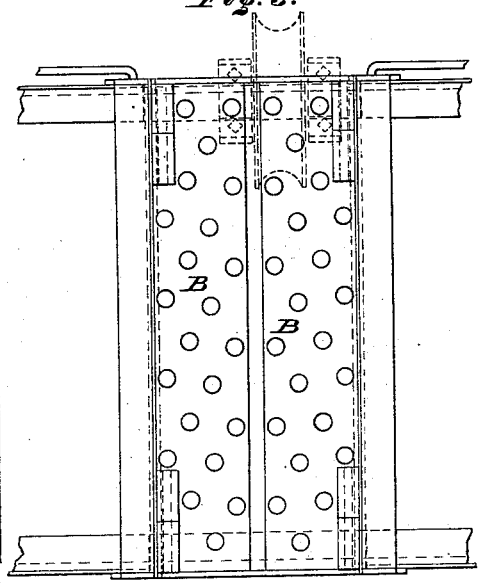
WITNESSES:
L. Douville
W. F. Kircher
INVENTOR
George Rice,
BY John A. Diedersheim
ATTORNEY.

UNITED STATES PATENT OFFICE.

GEORGE RICE, OF PHILADELPHIA, PENNSYLVANIA.

CONDUIT FOR CABLE RAILWAYS.

SPECIFICATION forming part of Letters Patent No. 304,860, dated September 9, 1884.

Application filed May 6, 1884. (No model.)

*To all whom it may concern:*

Be it known that I, GEORGE RICE, a citizen of the United States, residing in the city and county of Philadelphia, State of Pennsylvania, have invented a new and useful Improvement in Conduits for Cable Railways, which improvement is fully set forth in the following specification and accompanying drawings, in which—

Figure 1 is a transverse vertical section of the portion of a conduit for cable railways embodying my invention. Fig. 2 is a longitudinal section thereof. Fig. 3 is a top or plan view thereof.

Similar letters of reference indicate corresponding parts in the several figures.

My invention consists of a conduit for a cable railway having its top bars or slot-irons hinged to the side plates of the conduit, whereby access may be readily had to the interior of the conduit, and provided with means for sustaining or supporting said slot-irons when in closed position, as will be hereinafter fully set forth.

It also consists of means for strengthening the top bars or slot-irons, whereby they are well enabled to endure the weight of vehicles, &c., passing over the same.

Referring to the drawings, A represents the side plates of a conduit for a cable railway, the same being of usual construction.

B represents the top bars, or what are known as "slot-irons" or "slot-angle irons," the same being hinged on their outer sides to the top of the side plates, suitable ears and pintles being provided to form the hinges of the plates. By this provision the irons may by readily raised, thus opening the conduit and permitting access to the interior thereof for purposes of inspection, repairs, &c., the irons being afterward conveniently restored in position, thus closing the conduit, leaving the necessary space or passage between the irons for the cable-grip.

B′ represents pieces of angle or T irons, which are secured to the side plates of the conduit near the top thereof, and project horizontally therefrom, whereby when the slot-irons are in their normal positions closing the conduit they rest on said pieces B′, and are thereby firmly sustained or supported, said pieces in no wise interfering with the continuity of the slot or passage of the grip.

The hinged irons may be applied to each section of the conduit or at intervals to sections throughout the length of the conduit.

Depending from the inner or lower faces of the irons B are longitudinally-extending ribs C, which serve to strengthen the irons, adapting them to sustain the weight of vehicles, &c., passed over the same. These ribs are the vertical limbs of angle or T irons riveted or bolted to the irons B, whereby the latter are stiffened and braced and a strong structure is produced.

Having thus described my invention, what I claim as new, and desire to secure by Letters Patent, is—

1. A conduit for a cable railway, having hinged slot-irons and supports for the same formed of angle or T iron connected with the side plates of the conduit, substantially as and for the purpose set forth.

2. In a conduit for a cable railway, the slot-irons, in combination with angle or T irons, said slot-irons being hinged to the side plates of the conduit, and said angle or T irons being connected with the slot-irons, substantially as and for the purpose set forth.

3. A conduit for a cable railway, having hinged slot-irons, angle or T irons connected with said slot-irons, and supports for the slot-irons formed of angle or T iron connected with the side plates of the conduit, substantially as and for the purpose set forth.

4. In a conduit for a cable railway, the slot-irons hinged to the side plates, in combination with angle or T irons connected with said plates forming strengthening-ribs for the same, substantially as and for the purpose set forth.

GEORGE RICE.

Witnesses:
JOHN A. WIEDERSHEIM,
A. P. GRANT.